(12) United States Patent
Swaans et al.

(10) Patent No.: US 11,955,818 B2
(45) Date of Patent: Apr. 9, 2024

(54) METHOD AND DEVICES FOR PROVIDING OPERATIONAL FEEDBACK DURING POWER TRANSFER IN A WIRELESS POWER TRANSFER SYSTEM

(71) Applicant: ElectDis AB, Malmo (SE)

(72) Inventors: Laurens Swaans, Malmo (SE); Buon Kiong Lau, Lund (SE)

(73) Assignee: ELECTDIS AB, Malmö (SE)

( * ) Notice: Subject to any disclaimer, the term of this patent is extended or adjusted under 35 U.S.C. 154(b) by 39 days.

(21) Appl. No.: 17/285,505

(22) PCT Filed: Nov. 26, 2020

(86) PCT No.: PCT/EP2020/083503
§ 371 (c)(1),
(2) Date: Apr. 15, 2021

(87) PCT Pub. No.: WO2021/105282
PCT Pub. Date: Jun. 3, 2021

(65) Prior Publication Data
US 2022/0368171 A1 Nov. 17, 2022

(30) Foreign Application Priority Data
Nov. 29, 2019 (EP) ..................... 19212476

(51) Int. Cl.
*H02J 50/10* (2016.01)
*H02J 50/80* (2016.01)
*H04L 27/00* (2006.01)

(52) U.S. Cl.
CPC .............. *H02J 50/80* (2016.02); *H02J 50/10* (2016.02); *H04L 27/0008* (2013.01)

(58) Field of Classification Search
None
See application file for complete search history.

(56) References Cited

U.S. PATENT DOCUMENTS

| 9,384,885 | B2 | 7/2016 | Karalis et al. |
| 2005/0052279 | A1* | 3/2005 | Bridgelall .......... G06K 19/0724 340/10.1 |

(Continued)

FOREIGN PATENT DOCUMENTS

| DE | 10304584 A1 | 8/2004 |
| DE | 10304584 A1 | 8/2004 |

(Continued)

OTHER PUBLICATIONS

PCT; App. No. PCT/EP2020/083508; International Search Report and Written Opinion dated May 21, 2021.

(Continued)

*Primary Examiner* — Leigh M Garbowski
(74) *Attorney, Agent, or Firm* — Honigman LLP

(57) ABSTRACT

Disclosed is a method (310) for providing operational feedback during power transfer in a wireless power transfer system. The wireless power transfer system comprises a power transmit device arranged to transfer power over an inductive wireless power transfer interface operating at a transmit frequency to a power receive device. The wireless power transfer system is adapted to transfer information at half duplex using Frequency Shift Keying, FSK, in one direction and Amplitude Shift Keying, ASK, in the other direction. The method comprises transferring (308), at the transmit frequency by the power transmit device, power to the power receive device. During the transferring (308), the method further comprises transmitting (311), at the transmit frequency by one of the power transmit device or the power receive device, a first data packet to the other of the power transmit device or the power receive device using one of two modulation types being FSK or ASK. The method (310) further comprises receiving (311), by the other of the devices, the first data packet and, during the receiving (312) and if a signaling condition is determined (313) to be (Continued)

fulfilled, transmitting (314), at the transmit frequency, by the other of the devices to said one of the devices, operational information using the other of said modulation types. In addition to this, a power receive device, a power transmit device and a test system are introduced.

34 Claims, 7 Drawing Sheets

(56) References Cited

U.S. PATENT DOCUMENTS

| | | | |
|---|---|---|---|
| 2008/0256270 A1* | 10/2008 | Hubbs | H04L 45/12 |
| | | | 710/38 |
| 2013/0260676 A1 | 10/2013 | Singh | |
| 2013/0307345 A1 | 11/2013 | Kobayashi | |
| 2018/0366984 A1 | 12/2018 | Joye et al. | |
| 2019/0052117 A1 | 2/2019 | Martchovsky | |
| 2019/0058360 A1 | 2/2019 | Garbus et al. | |
| 2019/0305597 A1 | 10/2019 | Venkatraman et al. | |
| 2020/0099257 A1* | 3/2020 | Qiu | H01M 10/46 |

FOREIGN PATENT DOCUMENTS

| | | |
|---|---|---|
| EP | 1585015 A1 | 10/2005 |
| EP | 3073609 A1 | 9/2016 |
| EP | 3104498 A1 | 12/2016 |
| EP | 3420629 A1 | 1/2019 |
| EP | 3542475 A1 | 9/2019 |
| EP | 3542475 A1 | 9/2019 |
| WO | 2016034410 A1 | 3/2016 |
| WO | 2016077140 A1 | 5/2016 |
| WO | WO-201677140 A1 | 5/2016 |
| WO | 2017144387 A1 | 8/2017 |
| WO | 2018069478 A1 | 4/2018 |
| WO | WO-2018/069478 A1 | 4/2018 |
| WO | WO-2019/203539 A1 | 10/2019 |

OTHER PUBLICATIONS

PCT; App. No. PCT/EP2020/083508; International Preliminary Report on Patentability dated Apr. 22, 2022.

European Patent Office (EPO), Eurpoean Search Report for EP Application No. 19212476.6 dated Jul. 29, 2020.

International Searching Authority (ISA), International Search Report and Written Opinion for PCT Application No. PCT/EP2020/083503 dated Feb. 26, 2021.

\* cited by examiner

METHOD AND DEVICES FOR PROVIDING OPERATIONAL FEEDBACK DURING POWER TRANSFER IN A WIRELESS POWER TRANSFER SYSTEM

CROSS-REFERENCE TO RELATED APPLICATIONS

This application is a National Stage Application and claims priority under 35 U.S.C. § 371 to Patent Cooperation Treaty application PCT/EP2020/083503, filed Nov. 26, 2020, which claims the benefit of and priority under 35 U.S.C. § 119(e) to European Application No. 19212476.6, filed Nov. 29, 2019. Priority is claimed to both of these applications and the disclosures of these prior applications are considered part of the disclosure of this application, and to the extent allowed, the entire contents of the aforementioned applications are incorporated herein.

TECHNICAL FIELD

The present invention relates to wireless power transfer, specifically to inductive wireless power transfer. Even more specifically, the present invention relates to the communication of operational data during power transfer.

BACKGROUND

Wireless power transfer is showing strong progress, especially for wireless battery charging of mobile devices such as, for instance, mobile terminals, tablet computers, laptop computers, cameras, audio players, rechargeable toothbrushes, wireless headsets, as well as various other consumer products and appliances.

Typically, devices that support wireless charging rely on magnetic induction between planar coils. Two kinds of devices are involved, namely devices that provide wireless power (referred to as base stations or wireless power transmit devices), and devices that consume wireless power (referred to as mobile devices or power receive devices). Power transfer takes place from e.g. a base station to a mobile device. For this purpose, a base station contains a subsystem (a power transmitter) that comprises a primary coil, whereas a mobile device contains a subsystem (a power receiver) that comprises a secondary coil. In operation, the primary coil and the secondary coil will constitute the two halves of a coreless transformer. Typically, a power transmit device has a flat surface, on top of which a user can place one or more mobile devices (also typically having a flat surface), so as to enjoy wireless battery charging or operational power supply for the mobile device(s) placed on the base station. Common for all types of inductive power transfer is that the efficiency of the power transfer will depend on the distance between the coils and the alignment of the coils.

The Wireless Power Consortium has developed a wireless power transfer standard known as Qi. Other known wireless power transfer approaches include Alliance for Wireless Power, and Power Matters Alliance.

The wireless power transfer standard known as Qi by the Wireless Power Consortium will be referred to, without limitation, throughout this document as the presently preferred wireless power transfer manner applicable to the present invention. However, the invention may generally be applied also to other wireless power transfer standards or approaches, including but not limited to the ones mentioned above. Devices complying with Qi will be configured to interact according to a specified scheme before power transfer is initiated. The scheme moves from a selection state to a ping state and further to an identification & configuration state that is followed by a power transfer state. When the devices are in the power transfer state, power is transferred from the power transmit device to the power receive device. During the power transfer, the power receive device evaluates the power received and communicates desired increases or decreases in power to the power transmit device using a control error packet. The power transmit device will adjust its transferred power as requested by the power receive device in the control error packet. If the control error packet is not received as expected by the power transmit device, the power transmit device aborts the power transfer and the system reverts to the selection state.

This means that any failure in the communication from the power receive device to the power transmit device will result in a restart of the power transfer scheme. Each restart of the power transfer scheme may result in e.g. a mobile phone indicating interrupted charging, increased charging time due to the initiation process and/or reduced efficiency of the charging.

In US 2019/058360 A1, a method for negotiation of a power transfer protocol to use during power transfer is disclosed. Power transmission begins during a coil selection action, which comprises transmission of an FSK package, a sync packet. This transmission of followed by 50-150 ms of waiting in order to allow a power receiving device to respond to the sync packet.

WO 2019/203539 A1 relates to extended Control Error Packets (CEP) that are transmitted in response to a received packet. Data in the extended CEP will indicate whether transmission of packets should continue and/or if an operating point of a wireless power transmit device should be adjusted.

EP 3542475 A1 presents a testing system for use in testing of wireless power transfer. The testing system has at least one wireless power receiver circuit for receiving inductive power from an external wireless power transmitter. The testing system is arranged to detect received inductive power at at least two operating frequencies relating to both a wireless power standard and a wireless communication standard.

From the above it is understood that there is room for improvements.

SUMMARY

An object of the present invention is to provide a new type of wireless power transfer method and associated devices which are improved over the prior art and which eliminate or at least mitigate the drawbacks discussed above. More specifically, an object of the invention is to provide a wireless power transfer method and associated devices that are capable of communicating operational feedback during power transfer in a wireless power transfer system. These objects are achieved by the technique and technology set forth in the appended independent claims with preferred embodiments defined in the dependent claims related thereto.

In a first aspect, a method for providing operational feedback during power transfer in a wireless power transfer system is presented. The power transfer system comprises a power transmit device arranged to transfer power over an inductive wireless power transfer interface operating at a transmit frequency to a power receive device. The wireless power transfer system is adapted to transfer information at half duplex using Frequency Shift Keying, FSK, in one direction and Amplitude Shift Keying, ASK, in the other direction. The method comprises transferring, at the transmit frequency, by the power transmit device, power to the power receive device. During the transferring, the method further comprises transmitting, at the transmit frequency by one of the power transmit device or the power receive device, a first data packet to the other of the power transmit device or the power receive device using one of two modulation types being FSK or ASK. The method further comprises receiving, by the other of the devices, the first data packet. During the receiving and if a signaling condition is determined to be fulfilled, the method further comprises transmitting, at the transmit frequency, by the other of the devices to said one of the devices, operational information using the other of said modulation types.

According to one variant of method, the power transmit device is configured to transmit data and/or information using FSK and receive data and/or information using ASK. The power receive device is configured to transmit data and/or information using ASK and to receive data and/or information using FSK. The power transmit device will have frequency generation functionality and the modifications required to have this device achieve FSK modulation are fewer than those required by the power receive device.

In a further variant of the method, the device transmitting the first data packet is the power transmit device and the device transmitting the operational information is the power receive device. This is beneficial since this enables the power receive device to communicate problems and/or instructions back to the power transmit device already during the transmittal of the first packet.

In another variant of the method, the device transmitting the first data packet is the power receive device and the device transmitting the operational information is the power transmit device. This is beneficial since this enables the power transmit device to communicate problems and/or instructions back to the power receive device already during the transmittal of the first packet.

In yet another variant of the method, the device receiving the first data packet evaluates the signal quality of a modulated data signal comprising the first data packet and determines that said signaling condition is fulfilled if the evaluated quality of the modulated data signal fails to meet a threshold signal quality. This is beneficial since it enables e.g. problems relating to the first packet or the transferal of the first packet to be communicated already during the transmittal of the first packet.

In a further variant of the method, the device receiving the first data packet further generates a Signal Quality Indicator, SQI, representative of the evaluated quality of the modulated data signal and includes the SQI in the transmitted operational information. This is beneficial since the SQI provides a common metric that can be used to determine the quality of the first packet such that the device transmitting the first packet becomes aware of this and can act accordingly.

According to an even further variant of the method, the signal quality is evaluated at least with respect to a modulation depth of the modulated data signal comprising the first data packet. This is beneficial since the modulation depth is a good metric of the quality of the signal and a change in this will indicate that something has changed in the transfer.

In another variant of the method, the signal quality is evaluated at least with respect to a modulation speed of the modulated data signal comprising the first data packet. The modulation speed is a good metric of the signal quality since it relates to the e.g. clock synchronization.

In one variant of the method, the device receiving the first data packet determines that said signaling condition is fulfilled if the SQI is below a SQI limit. Having a set limit for the SQI is good since it avoids unnecessary communication and just the fact that the operational information is sent will indicate that the SQI is below the SQI limit.

In an even further variant of the method, the operational information is comprised in a payload of a second data packet. Having the operational information formatted as the payload enables the transmittal of further data in the packet and also helps the reception of the operational data when the format of the second packet is known.

According to another variant of the method, the signaling condition is determined to be fulfilled if the device receiving the first data packet has data to transmit. This enables the transmittal of data at any time enabling duplex communication in a half duplex system.

In a second aspect, a power transmit device is presented. The power transmit device is arrangeable in a wireless power transfer system to transfer power over an inductive wireless power transfer interface operating at a transmit frequency to a power receive device. The wireless power transfer system is of a type which is adapted to transfer information at half duplex using Frequency Shift Keying, FSK, in one direction and Amplitude Shift Keying, ASK, in the other direction. The power transmit device comprises a transmit controller operatively connected to a power transfer circuitry. The transmit controller is configured to cause the power transfer circuitry to:

transfer, at the transmit frequency, power to the power receive device, and during the transferring, receive, at the transmit frequency, using one of two modulation types being FSK or ASK, a first data packet and, during the receiving and if a signaling condition is determined to be fulfilled, transmit, at the transmit frequency, operational information using the other of said modulation types.

According to one variant of the power transmit device, it is further configured to perform the functionality of the power transmit device as recited in the method above, or parts of said functionality.

In a third aspect, a power receive device is presented. The power receive device is arrangeable in a wireless power transfer system to receive power over an inductive wireless power transfer interface operating at a transmit frequency from a power transmit device. The wireless power transfer system is of a type which is adapted to transfer information at half duplex using Frequency Shift Keying, FSK, in one direction and Amplitude Shift Keying, ASK, in the other direction. The power receive device comprises a receive controller operatively connected to a power receive circuitry. The power receive device is configured to cause the power receive circuitry to:

receive, at the transmit frequency, power from the transmit device, and during the receiving, receive, at the transmit frequency, using one of two modulation types being FSK or ASK, a first data packet and, during the receiving of the first data packet and if a signaling condition is determined to be fulfilled, transmit, at the transmit frequency, operational information using the other of said modulation types.

In one variant of the power receive device, it is further configured to perform the functionality of the power receive device as recited in the above, or parts of said functionality.

In a fourth aspect, a test system comprising a probe device and an analyzer device is presented. The probe device is arrangeable in a wireless power transfer system that comprises a power transmit device arranged to transfer power over an inductive wireless power transfer interface operating at a transmit frequency to a power receive device. The wireless power transfer system is of a type which is adapted to transfer information at half duplex using Frequency Shift Keying, FSK, in one direction and Amplitude Shift Keying, ASK, in the other direction. The probe device comprises at least one pickup coil and further comprises or is operatively connected to said probe analyzer device. The analyzer device is configured to detect a transferring, at the transmit frequency by the power transmit device, of power to the power receive device and, during the transferring detect a transmitting, at the transmit frequency by one of the power transmit device or the power receive device, of a first data packet to the other of the power transmit device or the power receive device using one of two modulation types being FSK or ASK. The analyzer device is further configured to detect, during the transmitting, if a signaling condition is fulfilled, a transmitting, at the transmit frequency, by the other of the devices to said one of the devices, of operational information using the other of said modulation types. The analyzer device is also configured to provide information regarding the detections as output.

In one variant of the test system it is further configured to detect if operational information is transmitted without the signaling condition being fulfilled and to generate an output to that respect. This enables the detection of false communication and helps troubleshoot and identify potential malfunctions of the devices.

In another variant of the test system, the analyzer device further comprises a generator configurable, by the analyzer device, to inject signals into the inductive wireless power transfer interface such that the signaling condition is fulfilled. This is beneficial since the test system will be able to evaluate if the devices react correctly to the signaling condition.

In yet another variant of the test system, the analyzer device is further configured to detect any of the transferred information as presented in the method above.

BRIEF DESCRIPTION OF THE DRAWINGS

Embodiments of the invention will be described in the following; references being made to the appended diagrammatical drawings which illustrate non-limiting examples of how the inventive concept can be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

Figure 1:
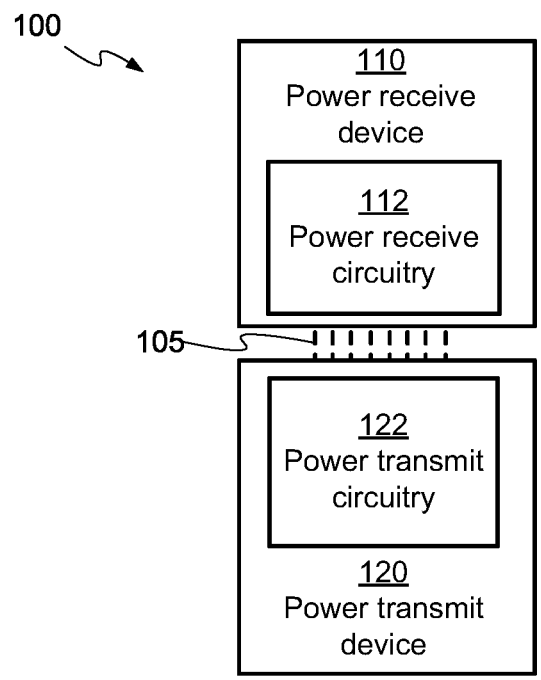
FIG. 1 is a block diagram of a wireless power transfer system according to some embodiments.

With reference to FIG. 1, a schematic view of a wireless power transfer system 100 is shown. The system comprises a power receive device 110 and a power transmit deice 120. The power transmit device 120 is arranged to transfer power to the power receive device 110. The power is transferred by inductive coupling over an inductive wireless power transfer interface 105. The inductive coupling is achieved through coupling a power transmit circuitry 122 comprised in the power transmit device 120 and a power receive circuitry 112 comprised in the power receive device 110. The inductive wireless power transfer interface 105 is typically an air interface and the inductive coupling between the devices 110, 120 is coreless.

In order for power to be transferred over the wireless inductive wireless transfer interface 105, the power transmit circuitry 122 will have to induce a receive current $I_{RX}$ in the power receive coil circuitry 112. A transmit current $I_{TX}$ alternating with a transmit frequency $f_{TX}$ will generate an electromagnetic field that propagates over the wireless inductive wireless transfer interface 105 to the power receive circuitry 112. This electromagnetic field will induce the receive current $I_{RX}$ in the power receive circuitry 112. The receive current $I_{RX}$ will be an alternating current, alternating with the transmit frequency $f_{TX}$. The actual power transferred will depend on, among other things, the coupling factor between the power transmit coil 127 and the power receive circuitry 112. Thus coupling is affected by factors such as the number of turns of coils comprised in the power receive and transmit circuitry respectively, the alignment of these coils and the distance between them. The transmit frequency $f_{TX}$ may affect the efficiency of the system, a too low frequency may cause one of the circuitries 112, 122 to saturate and a too high frequency would reduce efficiency by unnecessary switching.

Any wireless power transfer system in general, and the wireless power transfer system 100 of FIG. 1 in particular, will require some kind of communication between the devices 110, 120. If no communication was present in e.g. a wireless charging scenario, the power transmit device 120 would have no way of knowing how much power to transfer to the power receive device 110 but would have to target the same transfer power for all power receive devices 110. The power receive device 110 would have to handle whatever power was induced in its power receive circuitry 112 and power may have to be dissipated in a dummy load if the power received was too high. These problems are addressed in the Qi standard from the Wireless Power Consortium by the introduction of an information interface that will be briefly discussed with reference to FIG. 3 in the coming sections.

One way of communicating data between the transmit device 120 to the receive device 110 is to change the transmit frequency $f_{TX}$ of the power transmit device 120.

Figure 2A:
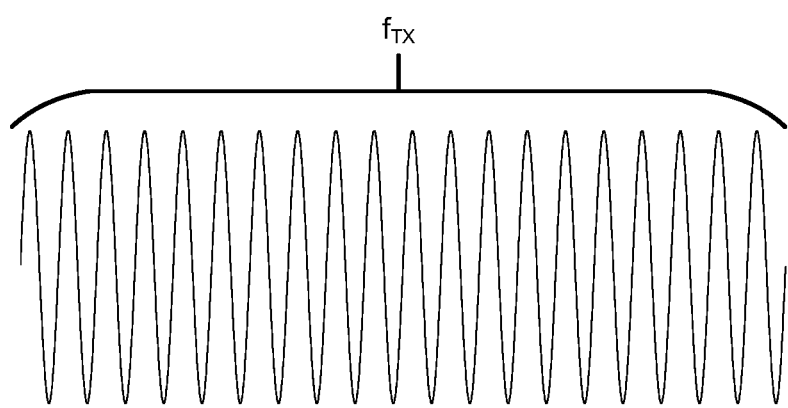
FIG. 2a-c are plots of different transmit signals.
Figure 2B:
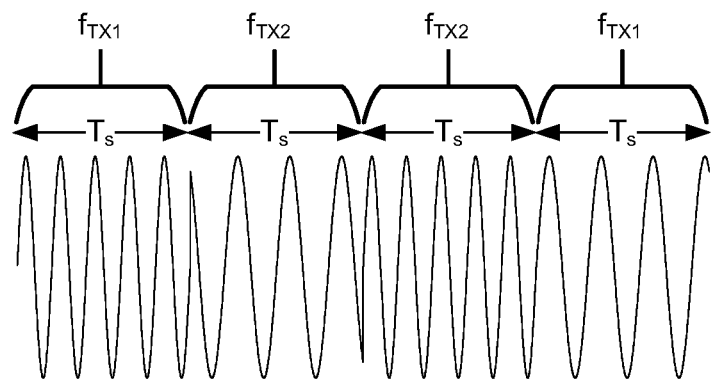

FIG. 2a shows a transmit signal provided to the transmit circuitry 122 that oscillates at a single transmit frequency $f_{TX}$. In FIG. 2b, the transmit frequency $f_{TX}$ changes periodically between a first transmit frequency $f_{TX1}$ and a second transmit frequency $f_{TX2}$. The time between each change can be described as a symbol time $T_S$. This change in transmit frequency $f_{TX}$ is detectable by the power receive device 110. The absolute difference between the first transmit frequency $f_{TX1}$ and the second transmit frequency $f_{TX2}$ is called the frequency deviation $f_{dev}$ and may be referred to as the modulation depth. This type of modulation is known in the art as Frequency Shift Keying, FSK, and the particular example of FIG. 2b with two different values of the transmit frequency is typically called Binary Frequency Shift Keying, BFSK.

Figure 2C:
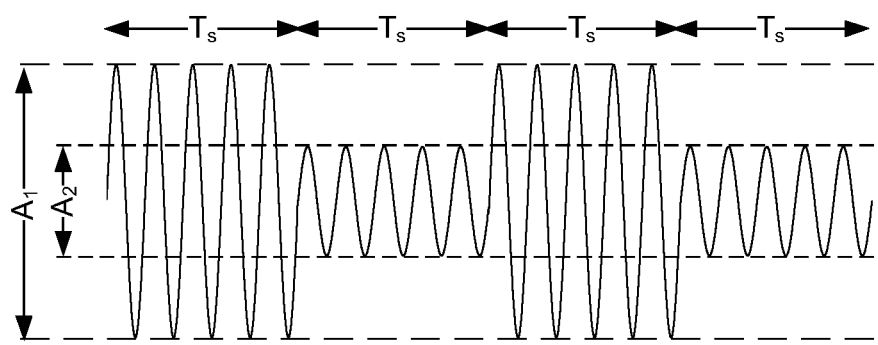

Another way of communicating data between the devices 120, 110 is to change the amplitude of the transmit signal periodically. This is shown in FIG. 2c where the amplitude of the transmit signal is changed with the symbol time $T_S$. The amplitude is changed between a first amplitude $A_1$ and a second amplitude $A_2$. The absolute difference between the first amplitude $A_1$ and the second amplitude $A_2$ is called the amplitude deviation $A_{dev}$ and may be referred to as the modulation depth. The change in amplitude is easily detectable by either of the devices 110, 120. Since the transmit circuitry 122 is inductively coupled to the receive circuitry 112, any change in the power receive circuitry 112 of the power receive device 110 will be detectable by the power transmit device 120. Simply put, this means that the power receive device 110 may change or modify its receive circuitry 112 and this would be seen as a change in amplitude of the transmit signal at the transmit circuitry 122 of the power transmit device 120. This is known as backscatter communication or ambient backscatter communication.

The change in the receive circuitry 112 may be implemented by switching or changing any suitable impedance element in the power receive circuitry 112, this will be explained in more detail in coming sections. This type of modulation is known in the art as Amplitude Shift Keying, ASK, and the particular example of FIG. 2c with two different values of the transmit frequency is typically called Binary Amplitude Shift Keying, BASK.

In true ASK, the modulation is typically achieved by purely resistive changes in the power receive circuitry 112. When reactive components are introduced in the impedance elements, phase shifts may occur during switching between amplitudes. In real applications, a purely resistive impedance element is difficult to achieve. Consequently, some shifting of the phase is expected. There may be implementations where the impedance element is mainly reactive which may be seen as a form of Phase Shift Keying, PSK.

In the Qi standard, the power transmit device 120 communicates by BFSK and the power receive device 110 by BASK.

Figure 3:
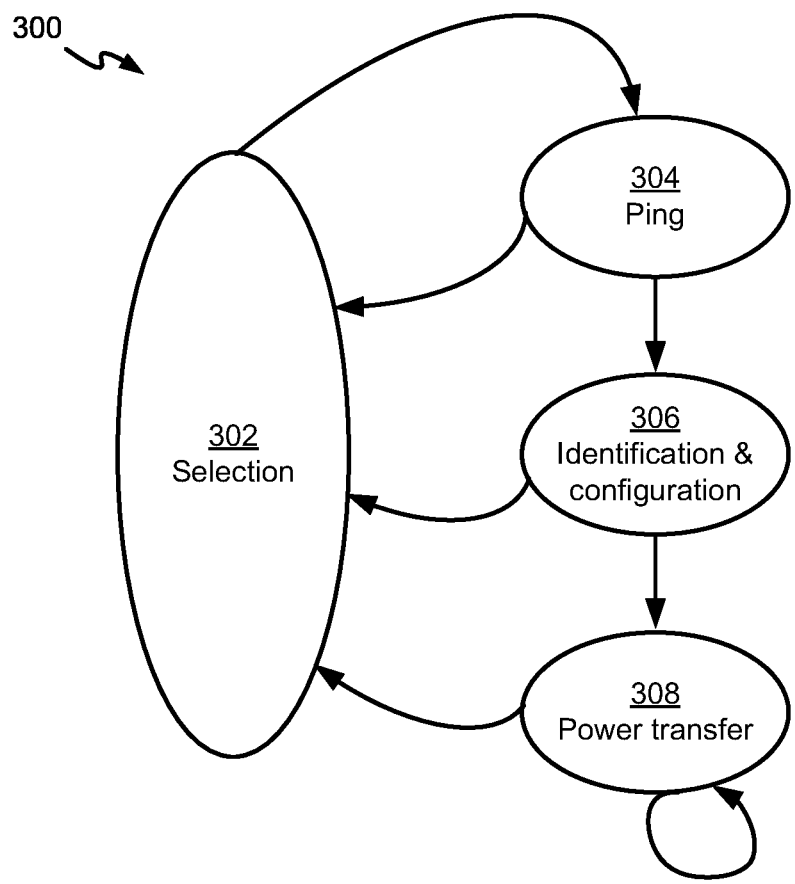
FIG. 3 is a simplified flow-chart of a process for wireless power transfer.

With reference to FIG. 3, a brief introduction to the Qi power transfer process 300 will be given. This will be a non-exhaustive description and given as a general introduction only. In order to save power, the process 300 starts with the selection phase 302 wherein the power transmit device 120 typically monitors the wireless inductive power interface 105 for changes, and particularly the introduction of a power receive device 110. When an object is detected in the wireless inductive power interface 105, the ping phase 304 is initiated. In the ping phase 304, the power transmit device 120 executes a digital ping by the power transmit device 120 providing a transmit signal of the transmit frequency $f_{TX}$ to the transmit coil 127. If a modulation is detected on the transmit signal within a predefined time period, the process 300 moves on to a identification & configuration phase 306. If no modulation is detected, the process 300 reverts back to the selection phase 302. In the identification & configuration phase 306, the power transmit device 120 identifies the power receive device 110 and obtains configuration information regarding e.g. maximum power to be transferred. The identification & configuration phase 306 may comprise a negotiation phase and a calibration phase (neither shown in FIG. 3) depending on capabilities of the power transmit device 120 and the power receive device 110. If errors should occur during the identification & configuration phase 306, the process 300 reverts back to the selection phase 302. If, on the other hand, the identification & configuration phase 306 is successful, the process 300 advances to a power transfer phase 308 wherein power is transferred and the control of the power transferred is based on control data transmitted by the power receive device 110. If the power transmitter 120 does not receive a communication from the power receive device 110 within a predetermined period of time, the power transmitter 120 will typically terminate the power transfer and revert to the selection phase 302.

The inventors of this invention have realized that the process 300 described above may be improved in many ways. It takes a fair amount of power to reach the power transfer phase 308 and the phases 302, 304, 306 leading up to this phase 308 will typically have to be repeated if something fails in the communication between the power receive device 110 and the power transmit device 120. Also, there is no way for the power transmit device 120 to initiate communication with the power receive device 110 when operating in the power transfer phase 308.

If, during the power transfer phase 308, the transmit device 120 has data to communicate to the receive device 110, the inventors have realized that the transmit device 120 may communicate data to the receive device 110 simultaneously as the receive device 110 communicates data to the transmit device 120. This is possible due to the different modulation types employed, one device will use FSK modulation and the other device will use ASK modulation. Typically, the power transmit device 120 will be configured to use FSK modulation and the power receive device 110 will use ASK modulation. This enables the wireless power transfer system 100 to transfer information at full duplex as opposed to the half-duplex as specified in e.g. the Qi specifications.

Figure 4:
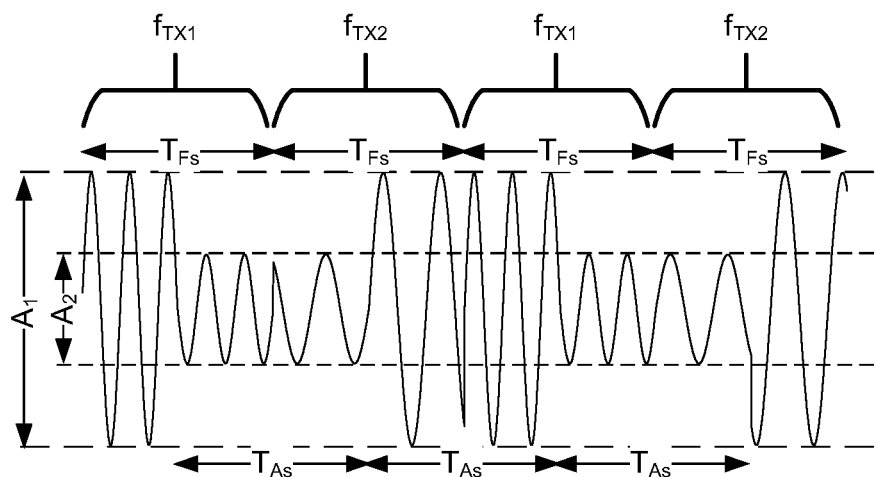
FIG. 4 is a plot of a transmit signal.

With reference to FIG. 4, a graph of the transmit signal being both ASK modulated and FSK modulated is shown. As shown also in FIG. 2c, the amplitude shifts between a first amplitude $A_1$ and a second amplitude $A_2$. As remembered from FIG. 2b, the frequency shifts between a first transmit frequency $f_{TX1}$ and a second transmit frequency $f_{TX2}$. In FIG. 4, the ASK and FSK modulations are phase shifted but they may very well be in phase. A symbol time $T_{Fs}$ of the FSK modulation may be different from a symbol time $T_{As}$ of the ASK modulation. From FIG. 4, it can be seen that the transmit signal can comprise two independent sets or streams of data. One FSK modulated set or stream of data and one ASK modulated set or stream of data.

Figure 5:
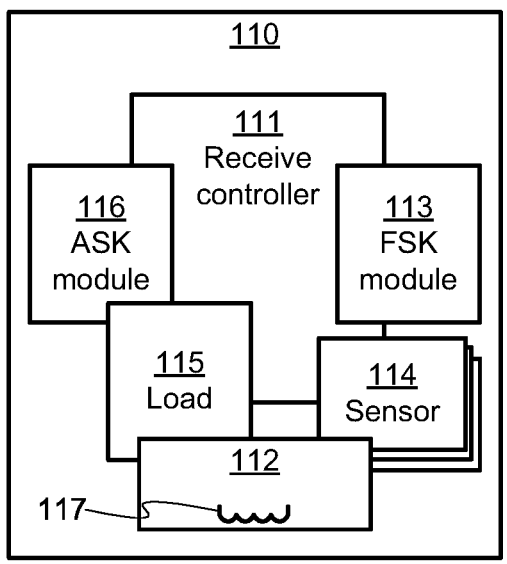
FIG. 5 is a block diagram of a power receive device according to some embodiments.

FIG. 5 shows a slightly more detailed schematic view of a power receive device 110. The power receive circuitry 112 comprises at least a power receive coil 117 that will enable coupling to the inductive wireless power transfer interface 105 such that a receive current $I_{RX}$ is induced in the power receive circuitry. The power receive circuitry 112 will typically comprise some kind of rectifier circuitry arranged to rectify the receive current $I_{RX}$ and the output of the rectifier may be operatively connected to e.g. a charging circuitry and/or a battery. The power receive device will typically comprise a load 115 that comprises an impedance element with an impedance $Z_L$. The power receive device 110 also comprises a receive controller 111 that may be configured to control at least the power transfer portion of the power receive device 110. The power receive device 111 further comprises an ASK module 116 that is configurable to ASK modulate the receive current $I_{RX}$ of the receive circuitry 112. One or more sensors 114 are also comprised in the power receive device 110, typically these sensors are arranged in or at the power receive circuitry 112 to provide metrics e.g. voltage, current, power, frequency and/or temperature to the receive controller 111. Further to this, the power receive device 110 comprises an FSK module 113 that is configurable to detect an FSK modulated signal comprised in the receive current $I_{RX}$ of the receive circuitry 112. Typically, the modulation modules 116, 113 will be comprised in or operatively connected to the receive controller 111. The modulation modules 116, 113 may be stand-alone hardware blocks/components or implemented in software. The ASK module 116 will be arranged to control the load 115 such that ASK modulation is achieved. The load 115 will be operatively connectable to the receive circuitry 112 and may be comprised in the receive circuitry 112 before or after, seen from the power receive coil 117, the rectifying circuitry of the power receive circuitry. Similarly, the FSK module 113 will be operatively connected to a frequency sensor that may be one of said one or more sensors 114 or a separate sensor that may be implemented in software configured to detect a frequency content of a digital representation of the receive current $I_{RX}$ and/or an associated receive voltage $V_{RX}$. The actual internal arrangement of the power receive device 110 may be varied in any number of ways and the skilled person will understand that the particular composition and interconnections will be adapted depending on the situation.

Figure 6:
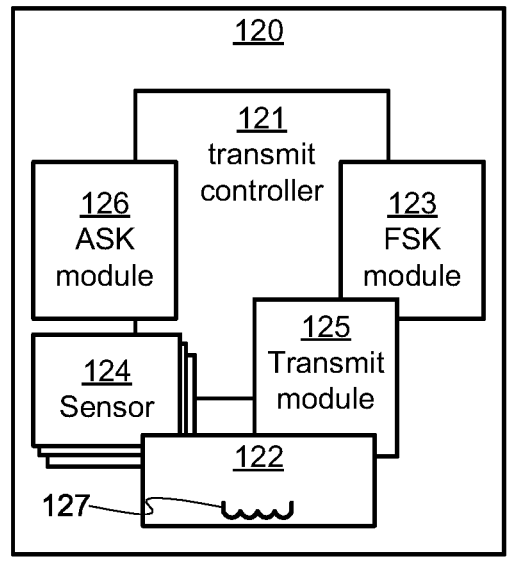
FIG. 6 is a block diagram of a power transmit device according to some embodiments.

The power transmit device 120 is schematically shown in FIG. 6. The power transmit device 120 comprises the power transmit circuitry 122 and a transmit controller 121 operatively connected to the power transmit circuitry 122. The transmit circuitry 122 comprises at least one power transmit coil 127 that will inductively couple to the power receive coil 117 of the power receive device 110. The transmit controller 121 is configured to control the excitation of the power transmit circuitry 122 and control the power delivered to the power receive device 110 via the inductive wireless power transfer interface 105. In order to achieve this, the power transmit device 120 comprises a transmit module 125 that is operatively connected to or comprised in the transmit controller 121. The transmit module 125 generates the transmit signal at the transmit frequency $f_{TX}$ and will change the transmit signal based on instructions received from the transmit controller and/or an FSK module comprised in the power receive device. An FSK 123 module controls the FSK modulation of the transmit module 125 and may be a stand-alone block/component or comprised in the transmit module 125 or the transmit controller. The power transmit device 121 will comprise one or more sensors 124, typically these sensors 124 are arranged in or at the power transmit circuitry 122 to provide metrics e.g. voltage, current, power, frequency and/or temperature to the transmit controller 121. The power transfer module further comprises an ASK module 122 operatively connected to receive ASK modulation form the transmit current $I_{TX}$ and/or an associated transmit voltage $V_{TX}$ in the transmit circuitry. Alternatively or additionally, the ASK module 122 may be configured to detect ASK modulation on a digital representation of the transmit signal. The actual internal arrangement of the power transmit device 120 may be varied in any number of ways and the skilled person will understand that the particular composition and interconnections will be adapted depending on the situation.

The modules 116, 113, 114, 122, 123, 124, and controllers 111, 121 introduced with reference to FIGS. 5 and 6 in the previous sections may be software or hardware modules or a combination of software and hardware. The functionality of the modules 116, 113, 114, 115, 122, 123, 124, 125 is described as isolated modules but this is for explanatory reasons only, each module may be distributed among or included in any the other modules.

In one embodiment of the power receive device 110, all modules 116, 113, 114 are comprised in the receive controller 111. In a further embodiment, all modules 116, 113, 114 are comprised in the receive controller 111 as software modules.

In one embodiment of the power transmit device 120, all modules 122, 123, 124 are comprised in the receive controller 121. In a further embodiment, all modules 122, 123, 124 are comprised in the transmit controller 121 as software modules.

The wireless power transfer system 100 of FIG. 1, the power receive device 110 of FIG. 5 and the power transmit device 120 of FIG. 6 are but examples of how devices and systems may be designed. There are many possible variations to these and the skilled person will know how, if, and when to modify the system or devices, respectively, in order to implement the teachings of this disclosure.

Figure 7A:
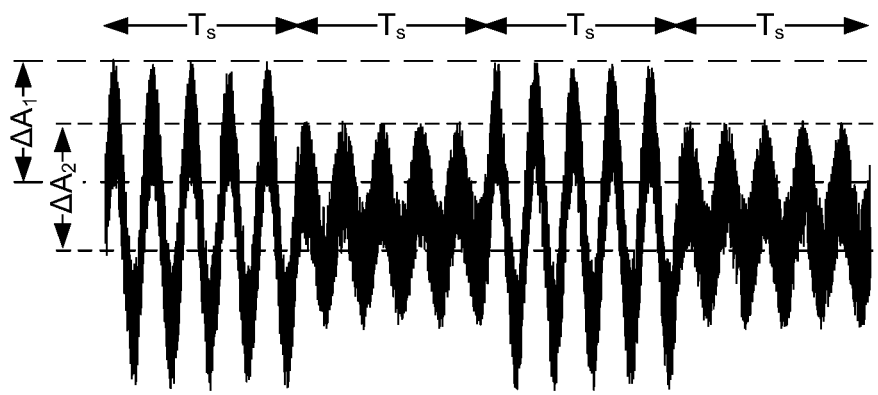
FIG. 7a-b are plots of different transmit signals.
Figure 7B:
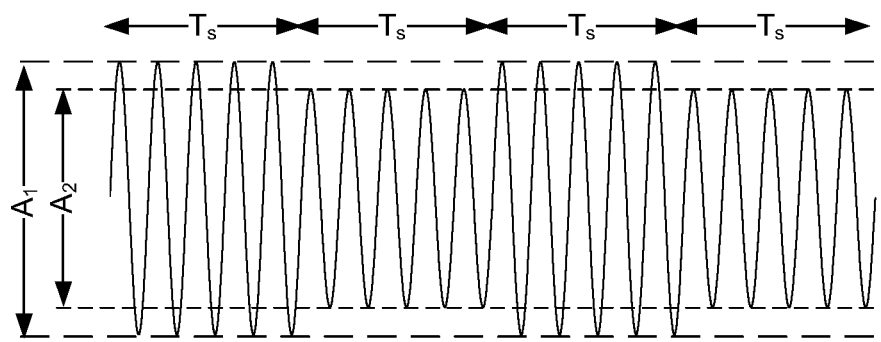

As mentioned with reference to FIG. 3 and the power transfer process 300, if the power transmitter 120 does not receive a communication from the power receive device 110 within a predetermined period of time, the power transmitter 120 will typically terminate the power transfer and revert to the selection phase 302. The probability of the power transmit device correctly decoding a received ASK symbol will depend on the modulation depth and any noise comprised in the signal comprising the ASK modulated signal. The relationship is commonly referred to as Signal to Noise Ratio, SNR, and is a common metric in communications. The SNR can, in simplified wording, be described as the useful part of a received signal divided by the noise of the received signal. If the SNR should decrease, the probability of a receiver correctly decoding the modulated signal will also decrease. In FIG. 7a, the signal of FIG. 2c has been subjected to a random noise and as seen a spread in the first amplitude $\Delta A_1$ is overlapping the corresponding spread in the second amplitude $\Delta A_2$. From the receiver perspective, it will be more difficult to correctly receive and decode the ASK modulated signal due to the difficulty in determining the amplitude deviation $A_{dev}$, i.e. a low SNR. In FIG. 7b, the transmit signal is depicted with an ASK modulation analogously to FIG. 2c. One difference between FIG. 7b and FIG. 2c is that the modulation depth, i.e. the absolute difference in amplitude between the first amplitude A1 and the second amplitude A2, is greatly decreased in FIG. 7b. As the modulation depth decreases, it will be increasingly difficult for the power transmit device to receive the communication from the power receive device.

There are many reasons for the ASK modulated signal to show behavior such as those in FIGS. 7a and 7b or a combination of them, i.e. poor amplitude deviation $A_{dev}$ and high noise. The noise could be any external or internal source generating a disturbance or thermal noise occurring due to heating of either the transmit device 120 or the receive device 110. The amplitude deviation $A_{dev}$ being low may be caused by e.g. poor coupling between the power transmit circuitry 122 and the power receive circuitry 112. Any such change in the received signal can be referred to as a change in modulation accuracy.

In the power transfer system 100, there are some noteworthy characteristics that typically increases the SNR in these types of systems 100. The most power will be transferred when data associated with the highest ASK amplitude is transmitted. This means that the transferred power decreases when data associated with the lower ASK amplitude is transmitted. The decrease in power transfer will be proportional to the amplitude deviation $A_{dev}$. Consequently, the amplitude deviation $A_{dev}$ will be kept as low as possible in order to maximize the power transfer but still sustain a reliable communication. This makes the data communication of the wireless power transfer system more sensitive to noise and the typical SNR of these systems is low. As was explained earlier with reference to FIG. 3, miscommunication or failure to communicate messages will result in re-iteration of the power transfer process 300.

The frequency modulation shown in e.g. FIG. 2b, assumes that the power transfer system 100 has a bandwidth that at least covers the frequency deviation and that the power transferred, i.e. a power transfer loss, is substantially the same for all modulation frequencies. This is the case if the transmit frequency $f_{TX}$ is the same as a resonance frequency of the power transfer system 100. However, this is typically not the case and also during FSK modulation, there may be unwanted shifts in amplitude. These unwanted amplitude shifts further affect the modulation accuracy and the SNR of the ASK modulation, increasing the risk of miscommunication and re-iteration of the power transfer process 300

By identifying the change in modulation accuracy, and with the realization that data can be sent using FSK modulation at the same time as ASK modulated data is received, or vice versa, it will be possible to communicate this change back to the device 110, 120 transmitting the data with the changed modulation accuracy. The transmitting device may, in response, take necessary steps to mitigate the change in modulation accuracy e.g. adjust its modulation depth etc. This scenario would reduce the risk of the power transfer process 300, as introduced with reference to FIG. 3, having to revert back to the selection phase 302 due to a missed communication during the power transfer phase 308. This will increase the system efficiency, power consumption and the average power transferred. As a consequence, the time it will take to fully charge a device in a wireless charging scenario will decrease.

The communication necessary to implement the added functionality to the wireless charging process 300 of FIG. 3 will now be described with reference to FIG. 8. In short, the method 310 will enable the transmission of operational feedback during power transfer in the wireless power transfer system 100. The method is executed during the power transfer phase 308. One device 120, 110 will transmit 311 a first data packet to the other device 110, 120. The other device 110, 120 will receive 312 the first data packet. During the receiving 312, the receiving device 110, 120 will determine 313 if a signal condition is fulfilled, this will be explained in coming sections, and if that is the case, transmit 314 operational information to the device 110, 120 transmitting 311 the data. From the explanation above, it is clear that either of the devices 110, 120 can transmit 311 or receive 312 the first data packet. The power transferred, the first data packet and the operational information are all transmitted simultaneously over the wireless power transfer interface at the transmit frequency $f_{TX}$. Naturally, the transmit frequency will change with the FSK modulation but it is important to remember that it is all occurring simultaneously on the same frequency during the transmission 311.

The step of receiving 312 the first data packet may comprise evaluating the signal comprising the first data packet with regards to one or more metrics relating to the quality of the signal. It may be a change in modulation accuracy, such changes may be represented in a Signal Quality Indicator, SQI. The SQI may comprise changes in modulation accuracy metrics as described with reference to FIGS. 7a-b, a change in frequency deviation, a change in symbol time $T_S$, $T_{Fs}$, $T_{As}$. Changes in symbol time $T_S$, $T_{Fs}$, $T_{As}$ can be seen as changes in a symbol rate, i.e. a bit rate or a modulation speed. The SQI may comprise any metric having to do with signal quality and is not limited to modulation accuracy. Either of the FSK module 113 of the power receive device 110 or the ASK module 122 of the power transmit device 120 may perform the receiving.

The operational data referred to in the method 310 may be any type of operational data. It may be the SQI as mentioned earlier or any metric obtained by said one or more sensors 114, 124. The operational data may comprise instructions to the device 110, 120 transmitting the first package configured to cause that device 110, 120 to perform certain actions. Such actions may be e.g. changing a modulation parameter. The operational data may be comprised in the payload of a second data packet. The second data packet may comprise any other type of data.

Determining if the signal condition is fulfilled 313, as referred to in the method 310, may comprise an evaluation of one or more of many different signal conditions such as the e.g. the SQI as presented in previous sections. The SQI may be compared to a predefined or configurable SQI limit. The SQI limit may be a value or a range and the signal condition may be that the SQI is below the SQI limit. Alternatively or additionally, it may be the other way around, where the signal condition is fulfilled if the SQI is above the SQI limit. The SQI limit may have some hysteresis associated with it, meaning that fulfilling the signal condition for SQI below the SQI limit is compared to a lower SQI limit than fulfilling the signal condition for SQI above the SQI limit. This implementation will reduce the risk of added signaling of operational data if the SQI is at the SQI limit and small changes in SQI will trigger the SQI limit.

The signal conditions may also be the device 110, 120 having operational data to send. Meaning that the device has something to communicate e.g. a request, sensor data or simply a periodic status.

Figure 8:
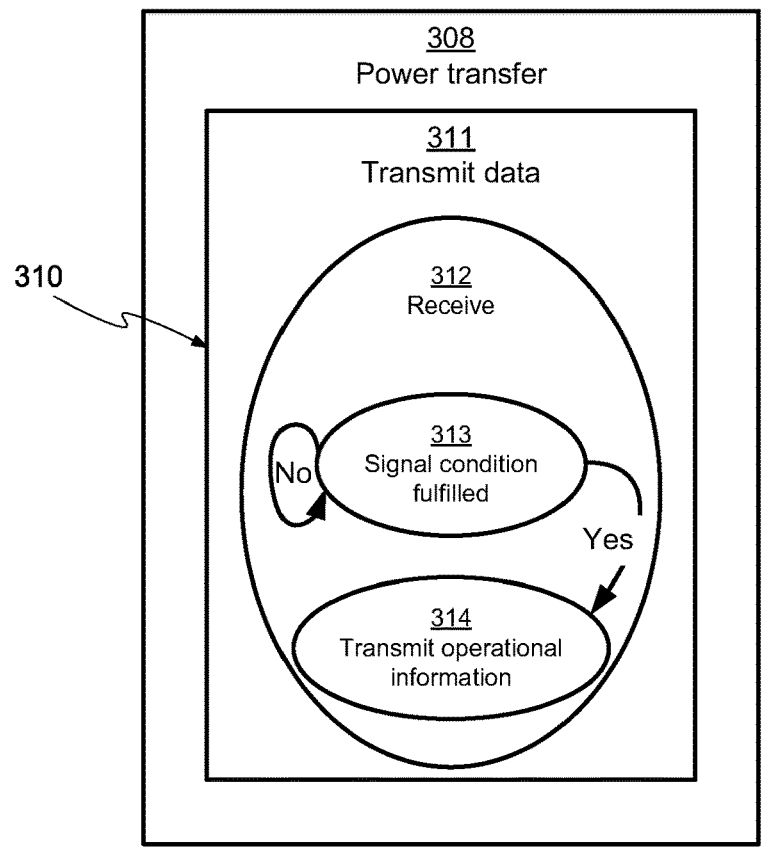
FIG. 8 is a simplified flow-chart of a method for providing operational feedback during power transfer according to some embodiments.

Since the steps described in the method 310 of FIG. 8 still comply with e.g. the Qi specification, it is something that can be implemented seamlessly and the added functionality will have no effect on legacy systems.

The power receive device 110 and the power transmit device 120 exemplified with reference to FIGS. 5 and 6 are both capable of performing the method 310 described above. Either device 110, 120 may be configured to transmit or receive the first package. The device transmitting the first package will have to activate its receiving module 113, 122 simultaneously with the transmission by the transmitting module 116, 123. In other words, the power receive device 110 will transmit the first package using its ASK module 116 while simultaneously receiving operational data from the power transmit device 120 using its FSK module 113. Alternatively, the power transmit device 120 will transmit the first package using its FSK module 123 while simultaneously receiving operational data form the power receive device 110 using its ASK module 122.

Typically, in the Qi specification, the power transmit device 120 will be the device receiving the first package. This is the communication associated with the power transfer phase 308 of the power transfer process 300 described in FIG. 3. The first package would, in such an embodiment, be the control data transmitted by the power receive device 110. If the first package comprising the control data would suffer from e.g. poor modulation accuracy and/or SQI, the method 310 described with reference to FIG. 8 would enable the power transmit device 120 to detect this as the signaling condition and communicate relevant operational information back to the power receive device 110. The power receive device 110 could perform e.g. necessary adjustments to its ASK module 116 such that the modulation accuracy and/or SQI is improved. As a result, the power transfer phase 308 can commence without having to revert to the selection phase 302, thereby avoiding a re-iteration of the power transfer process 300.

Figure 9A:
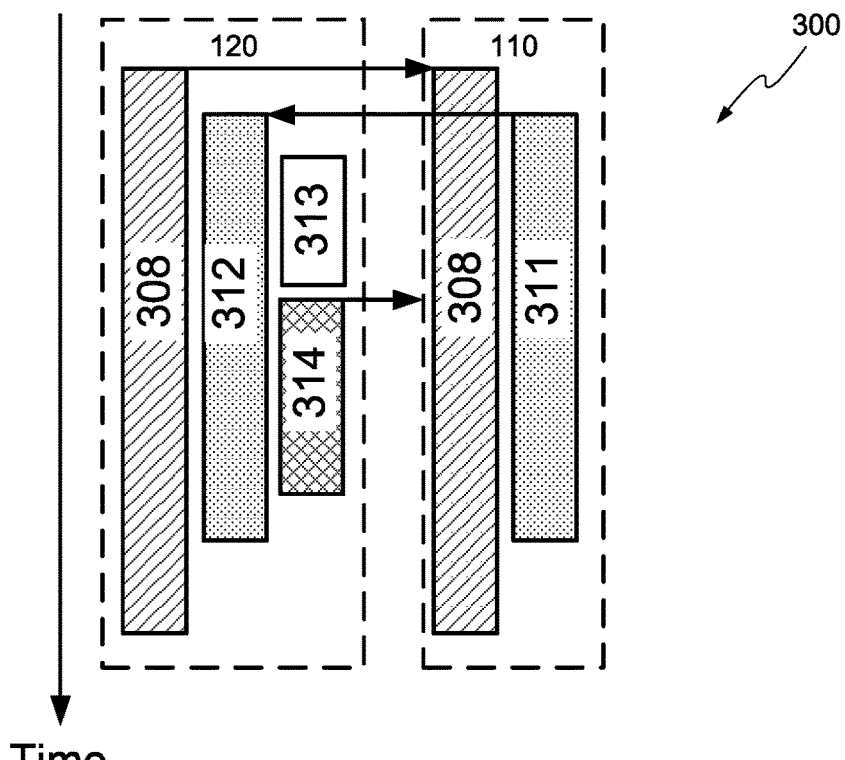
FIG. 9a-b are simplified time charts of a method for providing operational feedback during power transfer according to some embodiments.
Figure 9B:
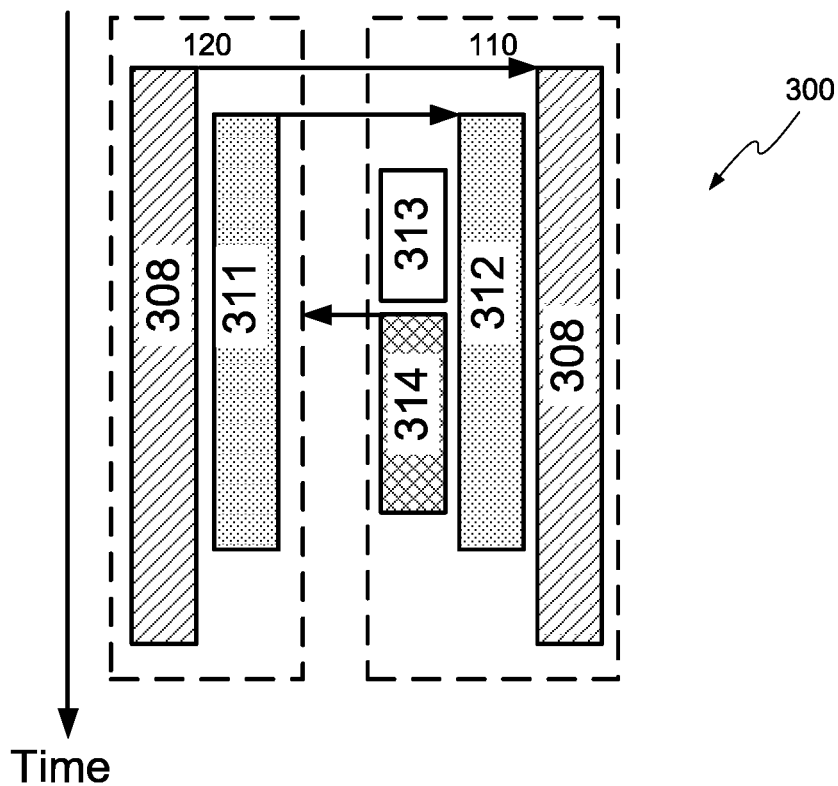

Turning briefly to FIGS. 9a-b, timing diagrams of the method 300 will be described. The timing diagrams are for emphasizing the parallel nature of the method 300 and is simply a different way of illustrating the information already given with reference to FIG. 8. In FIGS. 9a-b, a vertical axis showing flow of time is introduced.

Starting with FIG. 9a, a timing diagram of the method 300 according to one embodiment is shown, wherein the power receive device 110 transmits 311 the first data packet. The method 300 starts with the power transmit device 120 transferring 308 power to the power receive device 110. Consequently, the power receive device 110 is receiving the power transferred 308. The power receive device 110 transmits 311 the first data packet to the power transmit device 120 during the transferring 308 of power from the power transmit device 120. The first data packet is received 312 by the power transfer device 120. As the receiving 312 and the transmitting 311 of the first data packet take some time, the power transmit device 120 will monitor the signaling, and if the power transmit device 120 determines 313 that a signaling condition is fulfilled, the power transmit device 120 will transmit 314 operational information to the power receive device 110.

Turning to FIG. 9b, a timing diagram of the method 300 according to another embodiment is shown, wherein the power transmit device 120 transmits 311 the first data packet. The method 300 starts with the power transmit device 120 transferring 308 power to the power receive device 110. Consequently, the power receive device 110 is receiving the power transferred 308. The power transmit device 120 transmits 311 the first data packet to the power receive device 110 during the transferring 308 of power from the power transmit device 120. The first data packet is received 312 by the power receive device 110. As the receiving 312 and the transmitting 311 of the first data packet take some time, the power receive device 110 will monitor the signaling, and if the power receive device 110 determines 313 that a signaling condition is fulfilled, the power receive device 110 will transmit 314 operational information to the power transmit device 120.

From the description given above with reference to FIGS. 8-9, it is clear that the operational information is transmitted 314 during the transmitting 311 and receiving 312 of the first data packet, which in turn happens during the transferring 308 of power.

Figure 10:
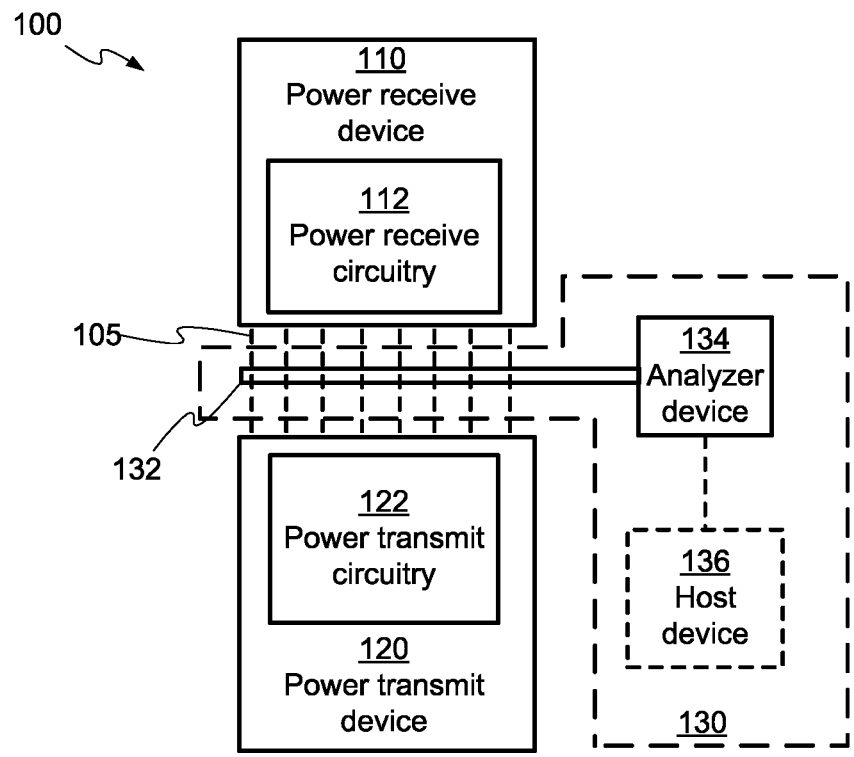
FIG. 10 is a block diagram of a test system and a wireless power transfer system according to some embodiments.

The novel and inventive process 310 described with reference to FIG. 8 can be verified, certified, trimmed and/or calibrated using a probe device 132. With reference to FIG. 10, a test system 130 will be introduced. The test system 130 comprises the probe device 132 an analyzer device 134 and an optional host interface 136. The probe device 132 is arrangeable in the wireless power transfer system 100 such that it can sniff the electromagnetic field of the inductive wireless power transfer interface 105. The probe device 132 either comprises or is operatively connected to the analyzer device 134. The analyzer device 134 may be in communication with the host device 136.

Figure 11:
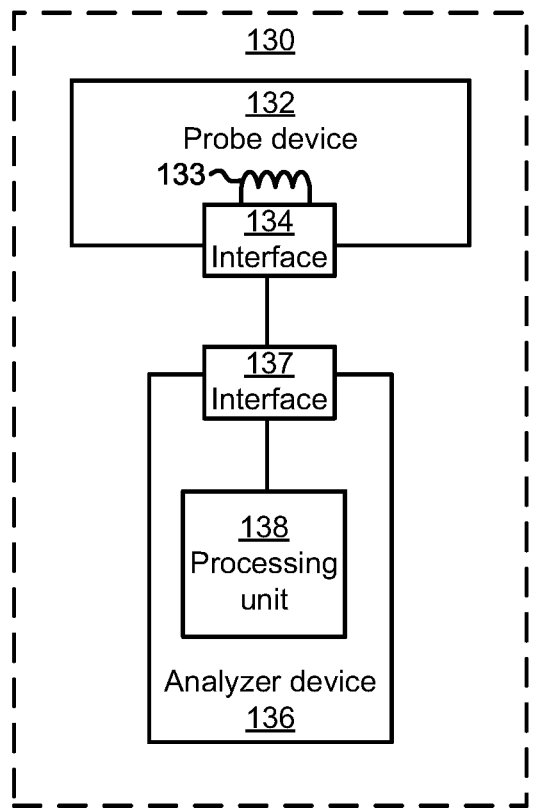
FIG. 11 is a block diagram of a test system according to some embodiments.

Turning to FIG. 11, a block diagram of the test system 130 is shown, depicting the probe device 132 and the associated analyzer device 134 in more detail. The probe device 132 comprises a pickup coil 133 which is to be arranged in the inductive wireless power transfer interface 105. Typically, the pickup coil 133 will be arranged between a surface of a housing of the wireless power transmit device 120 and a surface of a housing of the wireless power receive device 110, i.e. between the transmit coil 127 and the receive coil 117. This will enable the pickup coil 133 to generate electric signals by capturing the electro-magnetic signals exchanged between the wireless power transmit and receive devices 120, 110 pursuant to a wireless power transfer protocol 300, 310. The analyzer device 134, if it is not comprised in the probe device 132, connects to a probe interface 134 of the probe device 132 using a corresponding analyzer interface 137 of the analyzer device 134. The electromagnetic signals are transferred, using the interfaces 134, 137 to the analyzer device 134 where a processing unit 138 is comprised in the analyzer device 134. The probe device 132 may further comprise other sensors such as temperature sensors, etc., and sensor data from these sensors may also be received by the processing unit 138 through the interfaces 134, 137.

The analyzer device 134 will typically, using the processing unit 138, process the data and signals received from the probe device 132. The processing may comprise interpreting the signals sniffed by the pickup coil 133 to determine if the signaling conforms to e.g. the processes 300, 310 described in relation to FIGS. 3 and 8. The analyzer device 134 may further be configured to provide the results of the determining as output to e.g. a user or the optional host device 136. Additionally or alternatively, the analyzer device 134 may be configured to log data and/or signals provided by the probe device 132. The logs could be stored in a memory device comprised in the analyzer device 134, connected to the analyzer device 134 and/or communicated to a user and/or the host device 136. These logs may be analyzed by the analyzer device 134 to determine the accuracy with regards to e.g. modulation accuracy, timing, power etc., over a period of time in order to, for instance, detect trends or identify isolated events.

Figure 12:
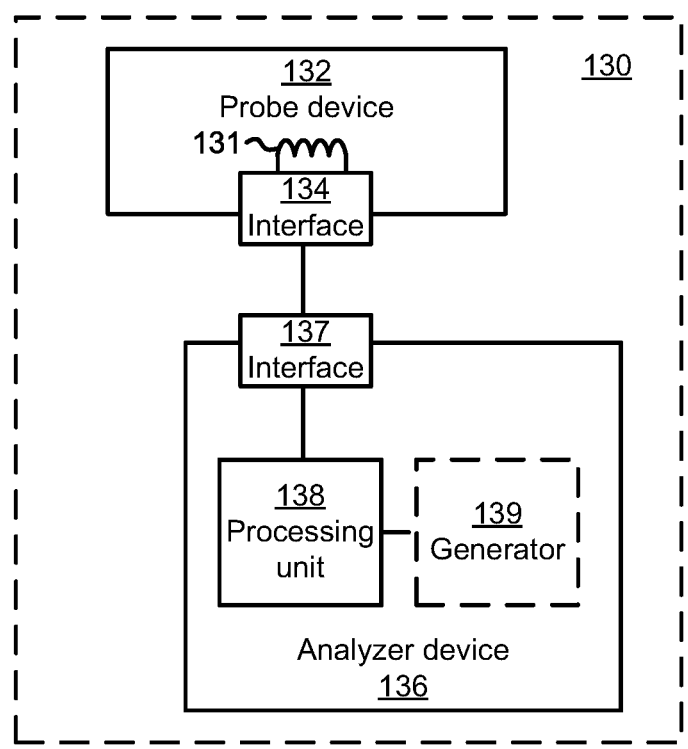
FIG. 12 is a block diagram of a test system according to some embodiments.

With reference to FIG. 12, one embodiment of the test system 130 is shown wherein the analyzer device 134 comprises an optional generator 139. The generator 139 may be configured to generate signals that are injected into the inductive wireless power transfer interface 105 by the probe device 132. These signals may be signals configured to trigger certain events related to the process 300, 310 to be tested. The generator 139 may be configured to generate signals, e.g. noise or other unwanted disturbances, that will affect the modulation quality of signals transmitted between power transmit device 120 and the power receive device 110. The disturbance signals may be configured such that they affect the first packet of the method 310 of FIG. 8, such that the signaling condition is fulfilled. In this embodiment, it is possible to verify if a power transmit device 120, a power receive device 110 and/or a wireless power transfer system 100 complies with the method 310 of FIG. 8.

As mentioned, the analyzer device 134 will be very useful in detecting if the method 310 is performed as intended and provide output to that respect. The output may be provided to an internal or external storage means, a user of the device or to the host device 136. In short, the probe device 132 will provide signals to the analyzer device 134 such that the analyzer can determine if the wireless power transfer system 100 is operating in the power transfer phase 308. If that is the case, the analyzer device 134 will be configured to detect if one of the power transmit device 120 or the power receive device 110 transmits 311 a first data packet. Since the analyzer device 134 cannot determine if the other of the devices receives 312 the first packet, it will have to monitor the inductive wireless power transfer interface 105 and detect if the signaling condition is fulfilled 313. If the signaling condition is fulfilled, the analyzer device 134 may be configured to detect that the other device transmits 314 operational information. The analyzer device 134 may further be configured to detect if e.g. operational information is transmitted without the signaling condition being fulfilled. Any detected deviations or violations of the processes 300, 310 described herein may result in the analyzer device 134 generating output indicating the deviation or violation.

What is claimed is:

1. A method for providing operational feedback during power transfer in a wireless power transfer system that comprises a power transmit device arranged to transfer power over an inductive wireless power transfer interface operating at a transmit frequency, $f_{TX}$, to a power receive device, the wireless power transfer system being adapted to transfer information at half duplex using Frequency Shift Keying, FSK, in one direction and Amplitude Shift Keying, ASK, in the other direction, the method comprising:
 transferring, at the transmit frequency, $f_{TX}$, by the power transmit device, power to the power receive device and, during the transferring:
  transmitting, at the transmit frequency, $f_{TX}$, by one of the power transmit device or the power receive device, a first data packet to the other of the power transmit device or the power receive device using one of two modulation types being FSK or ASK,
  receiving, by the other of the devices, the first data packet and, during the receiving and if a signaling condition is determined to be fulfilled, transmitting, at the transmit frequency, $f_{TX}$, by the other of the devices to said one of the devices, operational information using the other of said modulation types.

2. The method of claim 1, wherein the power transmit device is configured to transmit data and/or information using FSK and receive data and/or information using ASK, and the power receive device is configured to transmit data and/or information using ASK and to receive data and/or information using FSK.

3. The method of claim 1, wherein the device transmitting the first data packet is the power transmit device and the device transmitting the operational information is the power receive device.

4. The method of claim 1, wherein the device transmitting the first data packet is the power receive device and the device transmitting the operational information is the power transmit device.

5. The method of claim 1, wherein the device receiving the first data packet evaluates the signal quality of a modulated data signal comprising the first data packet and determines that said signaling condition is fulfilled if the evaluated quality of the modulated data signal fails to meet a threshold signal quality.

6. The method of claim 5, wherein the device receiving the first data packet further:
 generates a Signal Quality Indicator, SQI, representative of the evaluated quality of the modulated data signal; and
 includes the SQI in the transmitted operational information.

7. The method of claim 6, wherein the device receiving the first data packet determines that said signaling condition is fulfilled if the SQI is below a SQI limit.

8. The method of claim 5, wherein the signal quality is evaluated at least with respect to a modulation depth of the modulated data signal comprising the first data packet.

9. The method of claim 5, wherein the signal quality is evaluated at least with respect to a modulation speed of the modulated data signal comprising the first data packet.

10. The method of claim 1, wherein the operational information is comprised in a payload of a second data packet.

11. The method of claim 1, wherein the signaling condition is determined to be fulfilled if the device receiving the first data packet has data to transmit.

12. A power transmit device, arrangeable in a wireless power transfer system to transfer power over an inductive wireless power transfer interface operating at a transmit frequency, $f_{TX}$, to a power receive device, the wireless power transfer system being of a type which is adapted to transfer information at half duplex using Frequency Shift Keying, FSK, in one direction and Amplitude Shift Keying, ASK, in the other direction, wherein the power transmit device comprises a transmit controller operatively connected to a power transfer circuitry, and wherein the transmit controller is configured to cause the power transfer circuitry to:
 transfer, at the transmit frequency, fix, power to the power receive device, and during the transferring,
 receive, at the transmit frequency, using one of two modulation types being FSK or ASK, a first data packet and, during the receiving and if a signaling condition is determined to be fulfilled,
 transmit, at the transmit frequency, $f_{TX}$, operational information using the other of said modulation types.

13. The power transmit device of claim 12, further configured to transmit data and/or information using FSK and receive data and/or information using.

14. The power transmit device of claim 12, further configured to:
 evaluate the signal quality of a modulated data signal comprising the first data packet; and
 determine that said signaling condition is fulfilled if the evaluated quality of the modulated data signal fails to meet a threshold signal quality.

15. The power transmit device of claim 14, further configured to:
 generate a Signal Quality Indicator, SQI, representative of the evaluated quality of the modulated data signal; and
 include the SQI in the transmitted operational information.

16. The power transmit device of claim 15, further configured to determine that said signaling condition is fulfilled if the SQI is below a SQI limit.

17. The power transmit device of claim 14, wherein the signal quality is evaluated at least with respect to a modulation depth of the modulated data signal comprising the first data packet.

18. The power transmit device of claim 14, wherein the signal quality is evaluated at least with respect to a modulation speed of the modulated data signal comprising the first data packet.

19. The power transmit device of claim 12, wherein the operational information is comprised in a payload of a second data packet.

20. The power transmit device of claim 12, wherein the signaling condition is determined to be fulfilled if the power transmit device has data to transmit.

21. A power receive device, arrangeable in a wireless power transfer system to receive power over an inductive wireless power transfer interface operating at a transmit frequency, fix, from a power transmit device, the wireless power transfer system being of a type which is adapted to transfer information at half duplex using Frequency Shift Keying, FSK, in one direction and Amplitude Shift Keying, ASK, in the other direction, wherein the power receive device comprises a receive controller operatively connected to a power receive circuitry, and wherein the power receive device is configured to cause the power receive circuitry to:
  receive, at the transmit frequency, fix, power from the transmit device, and during the receiving,
  receive, at the transmit frequency, $f_{TX}$, using one of two modulation types being FSK or ASK, a first data packet and, during the receiving of the first data packet and if a signaling condition is determined to be fulfilled,
  transmit, at the transmit frequency, $f_{TX}$, operational information using the other of said modulation types.

22. The power receive device of claim 21, further configured to transmit data and/or information using ASK and to receive data and/or information using FSK.

23. The power receive device of claim 21, further configured to:
  evaluate the signal quality of a modulated data signal comprising the first data packet; and
  determine that said signaling condition is fulfilled if the evaluated quality of the modulated data signal fails to meet a threshold signal quality.

24. The power receive device of claim 23, further configured to:
  generate a Signal Quality Indicator, SQI, representative of the evaluated quality of the modulated data signal; and
  include the SQI in the transmitted operational information.

25. The power receive device of claim 24, further configured to determine that said signaling condition is fulfilled if the SQI is below a SQI limit.

26. The power receive device of claim 23, wherein the signal quality is evaluated at least with respect to a modulation depth of the modulated data signal comprising the first data packet.

27. The power receive device of claim 23, wherein the signal quality is evaluated at least with respect to a modulation speed of the modulated data signal comprising the first data packet.

28. The power receive device of claim 21, wherein the operational information is comprised in a payload of a second data packet.

29. The power receive device of claim 21, wherein the signaling condition is determined to be fulfilled if the power receive device has data to transmit.

30. A test system comprising a probe device and an analyzer device, the probe device being arrangeable in a wireless power transfer system that comprises a power transmit device arranged to transfer power over an inductive wireless power transfer interface operating at a transmit frequency, fix, to a power receive device, the wireless power transfer system being of a type which is adapted to transfer information at half duplex using Frequency Shift Keying, FSK, in one direction and Amplitude Shift Keying, ASK, in the other direction,
  wherein the probe device comprises at least one pickup coil and further comprises or is operatively connected to said probe analyzer device, and
  wherein the analyzer device is configured to:
    detect a transferring, at the transmit frequency, $f_{TX}$, by the power transmit device, of power to the power receive device and, during the transferring:
    detect a transmitting, at the transmit frequency, fix, by one of the power transmit device or the power receive device, of a first data packet to the other of the power transmit device or the power receive device using one of two modulation types being FSK or ASK,
    detect, during the transmitting, if a signaling condition is fulfilled, a transmitting, at the transmit frequency, $f_{TX}$, by the other of the devices to said one of the devices, of operational information using the other of said modulation types, and
    provide information regarding the detections as output.

31. The test system of claim 30, further configured to detect if operational information is transmitted without the signaling condition being fulfilled and to generate an output to that respect.

32. The test system of claim 30, wherein the analyzer device further comprises a generator configurable, by the analyzer device, to inject signals into the inductive wireless power transfer interface such that the signaling condition is fulfilled.

33. The test system of claim 30, wherein the analyzer device is further configured to detect a Signal Quality Indicator, SQI, being included in the transmitted operational information, the SQI being representative of an evaluated quality of a modulated data signal comprising the first data packet.

34. The test system of claim 30, wherein the operational information is comprised in a payload of a second data packet.

* * * * *